United States Patent
Elliott (10) Patent No.: US 10,445,420 B2
(45) Date of Patent: Oct. 15, 2019

(54) ELECTRONIC FORM MOBILITY HAND-OFF

(71) Applicant: Access eForms, L.P., Sulphur Springs, TX (US)

(72) Inventor: Tim Elliott, Sulphur Springs, TX (US)

(73) Assignee: Access eForms, L.P., Sulphur Springs, TX (US)

( * ) Notice: Subject to any disclaimer, the term of this patent is extended or adjusted under 35 U.S.C. 154(b) by 0 days.

(21) Appl. No.: 15/807,065

(22) Filed: Nov. 8, 2017

(65) Prior Publication Data

US 2018/0129641 A1 May 10, 2018

Related U.S. Application Data (60) Provisional application No. 62/418,908, filed on Nov. 8, 2016.

(51) Int. Cl.
| | |
|---|---|
| *G06F 3/00* | (2006.01) |
| *G06F 17/24* | (2006.01) |
| *G06K 7/14* | (2006.01) |
| *G06K 7/10* | (2006.01) |
| *G06F 17/22* | (2006.01) |

(52) U.S. Cl.
CPC ....... *G06F 17/243* (2013.01); *G06K 7/10722* (2013.01); *G06K 7/1413* (2013.01); *G06F 17/2205* (2013.01); *G06F 17/2288* (2013.01); *G06K 2007/10524* (2013.01)

(58) Field of Classification Search
CPC .... G06F 17/24; G06F 17/243; G06F 17/2205; G06K 7/14; G06K 7/10; G06K 7/1413; G06K 7/10722; G06K 17/2288; G06K 17/2205
See application file for complete search history.

(56) References Cited

U.S. PATENT DOCUMENTS

| | | | | |
|---|---|---|---|---|
| 7,668,809 | B1* | 2/2010 | Kelly | G06F 17/30528 705/5 |
| 2002/0184256 | A1* | 12/2002 | Reich | G06F 17/30887 715/234 |
| 2004/0205490 | A1* | 10/2004 | Haeuptle | G06F 17/30887 715/205 |
| 2006/0059416 | A1* | 3/2006 | Lin | G06F 17/289 715/208 |
| 2011/0004943 | A1* | 1/2011 | Chaganti | H04L 29/06 726/30 |
| 2011/0295936 | A1* | 12/2011 | Gill | G06F 17/30873 709/203 |
| 2012/0084199 | A1* | 4/2012 | Stone | G06F 17/243 705/39 |

(Continued)

*Primary Examiner* — Kyle R Stork
(74) *Attorney, Agent, or Firm* — DuBois, Bryant & Campbell, LLP; William D. Wiese (57) ABSTRACT

Apparatus and method by which editing control, but not ownership, of electronic documents are transferred from one device, such as a desktop personal computer, to a mobile device, such as a tablet or smartphone. Online forms residing in a catalog on the server are associated with a customer. The customer is identified within the instance of the form by a unique identification code. The forms are queued or staged within the server for completion by or for that customer. To transfer editing control to a mobile device, a barcode is displayed on the monitor which conveys information regarding the form to the mobile device through its camera.

12 Claims, 12 Drawing Sheets

(56) References Cited

U.S. PATENT DOCUMENTS

| | | | | |
|---|---|---|---|---|
| 2012/0203696 A1* | 8/2012 | Morgan | ............ | G06Q 20/3276 |
| | | | | 705/44 |
| 2012/0330769 A1* | 12/2012 | Arceo | .................... | G06Q 20/32 |
| | | | | 705/21 |
| 2013/0151935 A1* | 6/2013 | DeLuca | ................ | G06F 17/243 |
| | | | | 715/205 |
| 2013/0238455 A1* | 9/2013 | Laracey | ............... | G06Q 20/108 |
| | | | | 705/21 |
| 2013/0238503 A1* | 9/2013 | Patel | ................... | G06Q 20/385 |
| | | | | 705/44 |
| 2015/0294068 A1* | 10/2015 | Bartlett, II | ............ | G06F 19/322 |
| | | | | 705/51 |
| 2016/0244311 A1* | 8/2016 | Burks | .................. | B67D 1/0888 |
| 2017/0132594 A1* | 5/2017 | Morgan | ................ | G06Q 20/12 |
| 2018/0047108 A1* | 2/2018 | Silverstone | ............ | G06Q 40/08 |

\* cited by examiner

ELECTRONIC FORM MOBILITY HAND-OFF

PRIORITY STATEMENT

Under 35 U.S.C. § 119 & 37 C.F.R. § 1.78

This non-provisional application is a U.S. patent application which claims priority based upon prior U.S. Provisional Patent Application Ser. No. 62/418,908 filed on Nov. 8, 2016, in the name of Tim Elliott entitled "ELECTRONIC FORM MOBILITY HAND-OFF," the disclosures of which are incorporated herein in their entirety by reference as if fully set forth herein.

BACKGROUND OF THE INVENTION

Documents can often be shared for real-time collaboration between two or more parties by web-based applications or sent to additional parties for editing as an attachment to an email if the document owner knows the network share names or email addresses of the other parties. However, there are no current processes by which a document can be passed (handed off) securely with an audit trail from a desktop personal computer or server to a mobile device such as a smartphone or tablet for purposes of editing without also releasing ownership of that document.

SUMMARY OF THE INVENTION

Various embodiments of the present invention include a method and system for transferring online forms from a fixed location, such as a desktop computer screen, to a mobile device for mobility purposes and greater ease of form completion. Generally speaking, there are two steps to the method and system of the present invention.

In various embodiments of the invention, online forms, which are form documents delivered through a browser, reside in a catalog on the server. Once initiated, they are associated with a customer, either the initiator themselves or a customer that has been previously selected by the initiator. The associated customer is identified within the instance of the form by a unique customer identification code such as Customer Number, Vendor ID, Employee ID, etc. These forms are then queued or staged within the server for completion by or for that customer.

When the forms are required to be transferred to a mobile device, the initiator simply clicks on the hand-off icon either within the desktop application or on the form itself, and the unique customer identification code is generated into a two-dimensional barcode which is displayed on the computer monitor or PC display. One unique aspect of the present invention is the generation of the two dimensional barcode containing the unique customer identification code in conjunction with the mobility scanning application's design to retrieve the pending on-line forms.

The hand-off application is then launched on the mobile device, which then activates the camera on the mobile device and uses it as a scanner to acquire the barcode. Once the barcode is scanned, the hand-off application connects back to the server and retrieves all pending on-line forms that are associated with the unique customer identification code and displays them on the mobile device in sequence, much as a set of paper forms on a clipboard would be presented.

The foregoing has outlined rather broadly certain aspects of the present invention in order that the detailed description of the invention that follows may better be understood.

Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which:

FIG. 12 is a screen shot showing a form completed using one embodiment of the hand-off process of the present invention.

DESCRIPTION OF THE PREFERRED EMBODIMENTS

The present invention is directed to improved methods and systems for, among other things, electronic document transfer. The configuration and use of the presently preferred embodiments are discussed in detail below. It should be appreciated, however, that the present invention provides many applicable inventive concepts that can be embodied in a wide variety of contexts other than electronic document transfer. Accordingly, the specific embodiments discussed are merely illustrative of specific ways to make and use the invention, and do not limit the scope of the invention. In addition, the following terms shall have the associated meaning when used herein:

"barcode" includes a barcode, a QR code, and any other optical, machine-readable, representation of data;

"form" or "form document" means a document with a static portion interspersed with spaces, fields or placeholders in which a user provides input;

"mobile device" means any portable handheld computing device, typically having a display screen with touch input and/or a miniature keyboard; and "monitor" means PC monitor, PC screen, TV screen, desktop display, broadcast monitor, broadcast video monitor, broadcast reference monitor or other display device used to monitor the output of a video-generating device, such as a computer.

As will be apparent to those skilled in the art, many of the methods and systems depicted herein are without each and every component required for full functionality. In each case the depiction is intended to show the functional aspects of the method or device for a better understanding of the invention and should not necessarily be construed as including all of the elements of a fully operational device.

Figure 1:
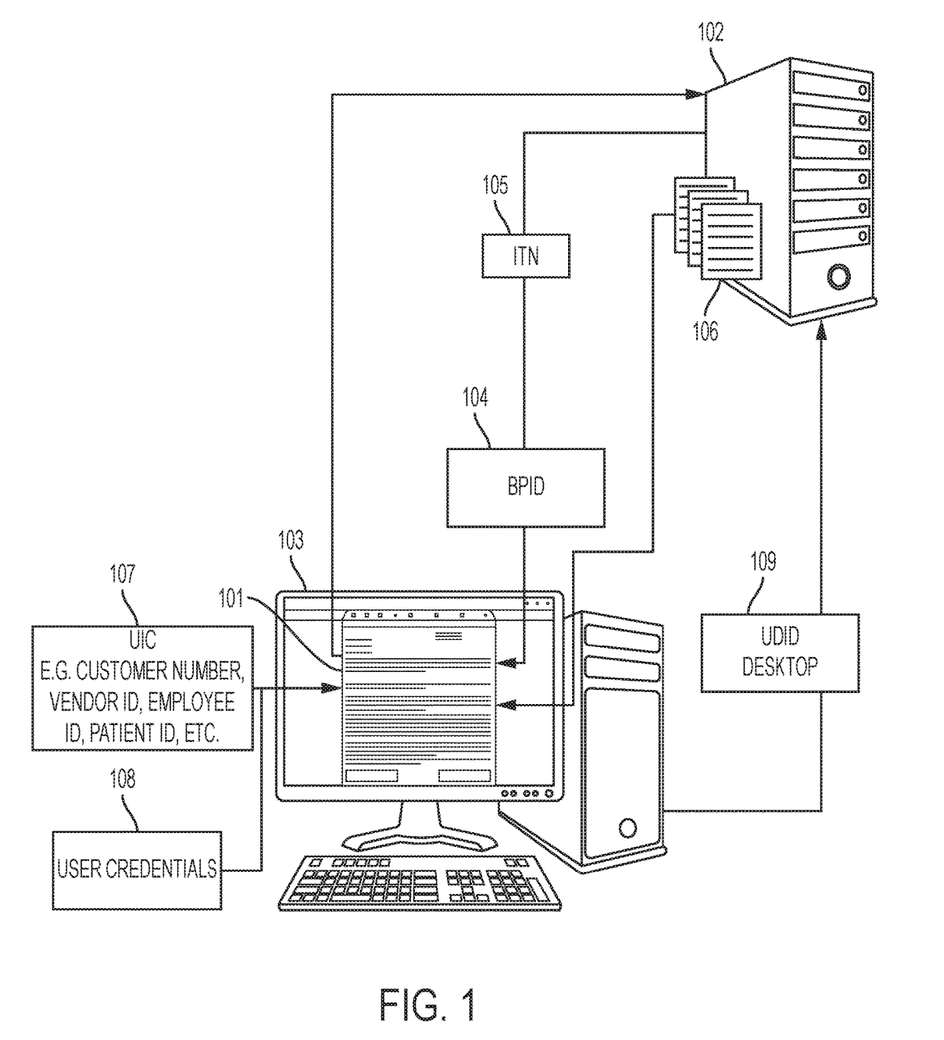
FIG. 1 is a system diagram showing the process of initiating transfer of a form from the server to a desktop environment and assigning it to a customer queue for later completion.
Figure 2:
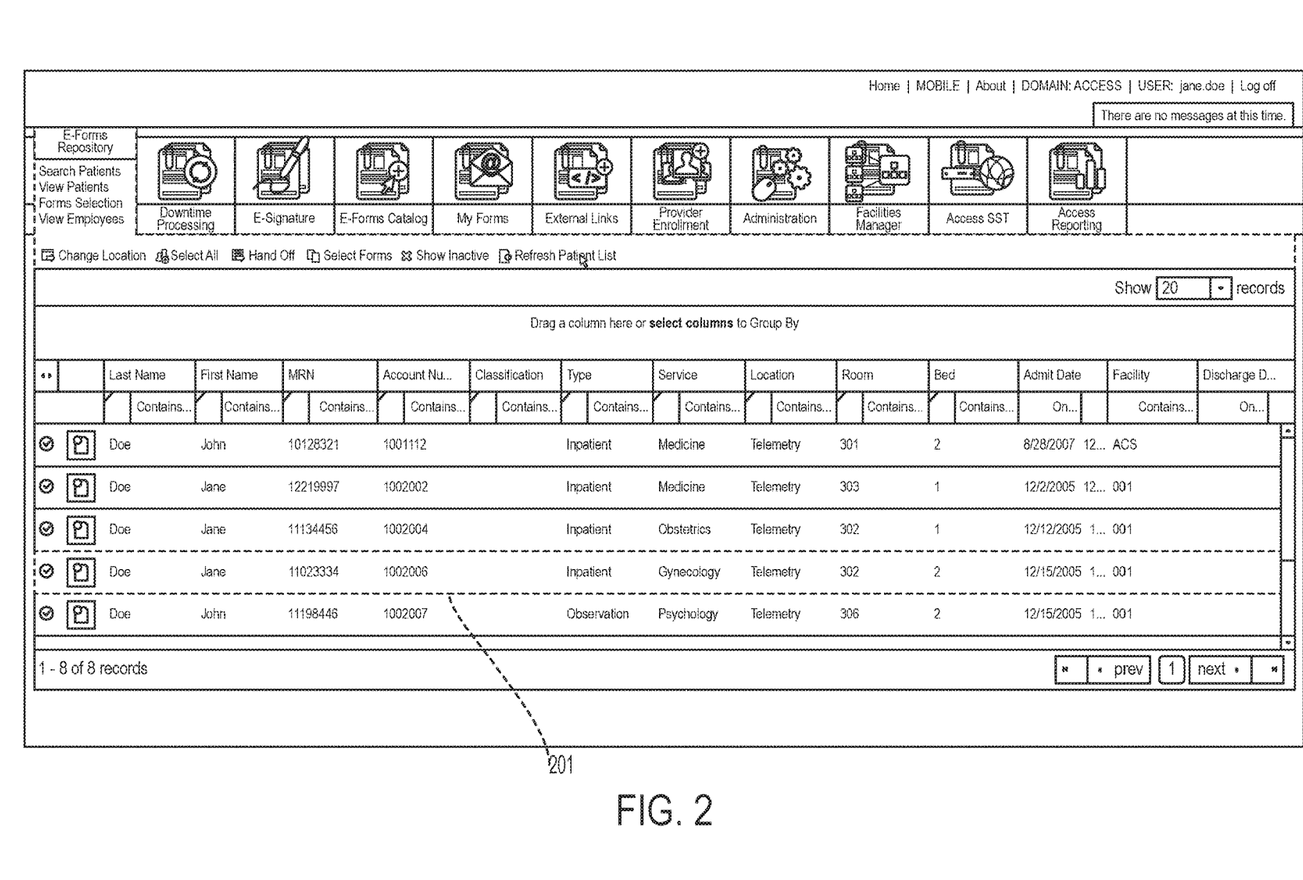
FIG. 2 is a screen shot showing one embodiment of the Patient Selection Screen of the present invention.
Figure 3:
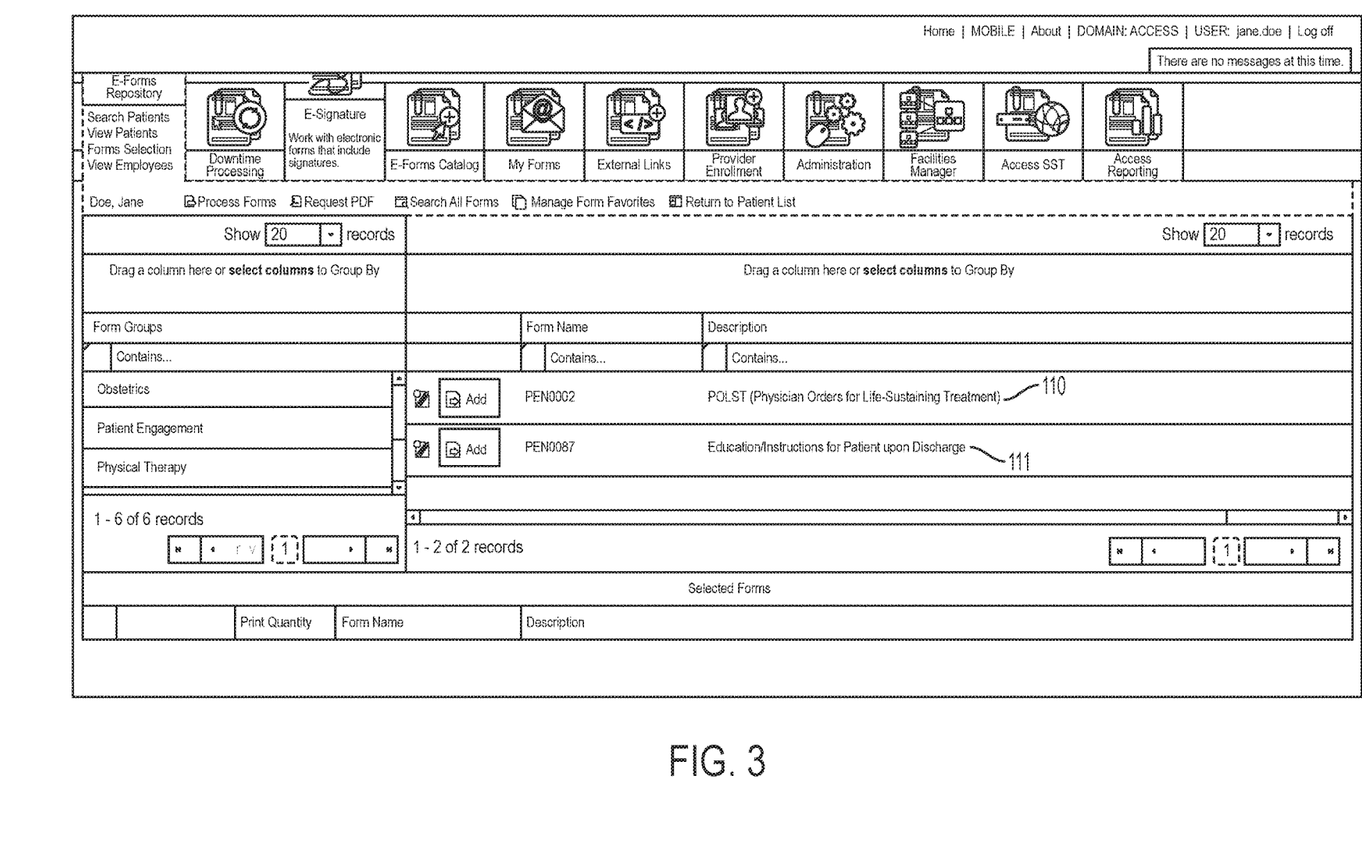
FIG. 3 is a screen shot showing one embodiment of the Form Selection Screen of the present invention.

Referring now to FIG. 1 which shows one embodiment of the present invention in which a user initiates a new instance of a form 101 from the server 102 by use of a desktop personal computer (PC) 103. For example, a user may select a specific patient 201, in this case, "Jane Doe, from a Patient Selection Form such as shown in FIG. 2. This selection would link to a Form Selection Screen, such as shown in FIG. 3, from which the user would select a specific form to be completed such as, for example, a Physician Orders for Life-Sustaining Treatment 110 or an Education/Instructions for Patient Upon Discharge 111.

The initiation of the form 101 is associated with a unique Business Process ID (BPID) 104 and Instance Tracking Number (ITN) 105. Each instance of the form resides in a catalog 106 on the server 102.

Once initiated, the form 101 may be associated with a customer, either the user themselves or a customer that has been previously designated by the user. The associated customer is identified within the instance of the form 101 by a unique customer identification code such as Customer Number, Vendor ID, Employee ID, etc. 107. These forms 101 are then queued or staged within the server 102 for completion by or for that customer.

The User Credentials (UC) 108 and Unique Device Identification (UDID) 109 of the initiating user and the user's device are collected and stored on the server 102 along with the BPID 104 and ITN 105.

Figure 4:
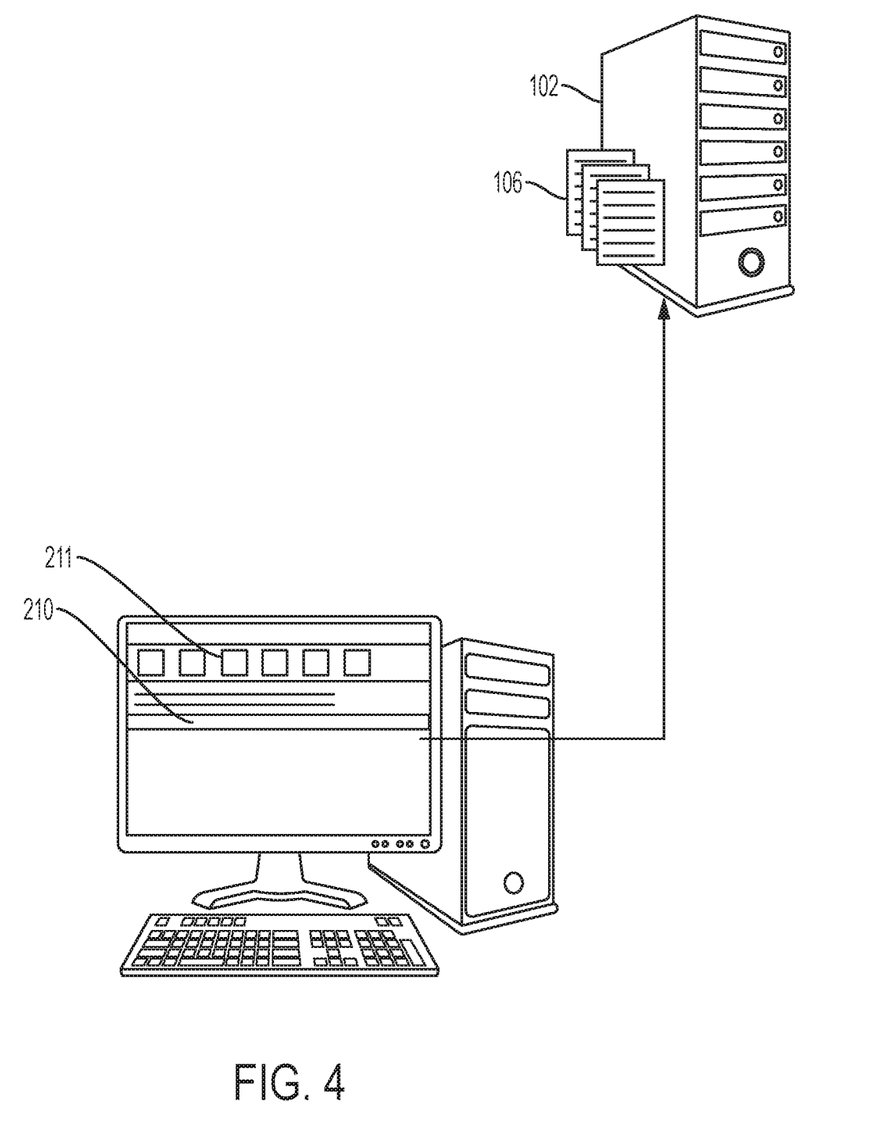
FIG. 4 is a system diagram showing the process of selecting the queued form and performing some initial entry into that form.

Referring now to FIG. 4. When the initiating user has finished creating the form 101, he can initiate the transfer of the form to a mobile device for further editing by selecting the appropriate form for transfer on the Form Selection Screen 210.

Figure 5:
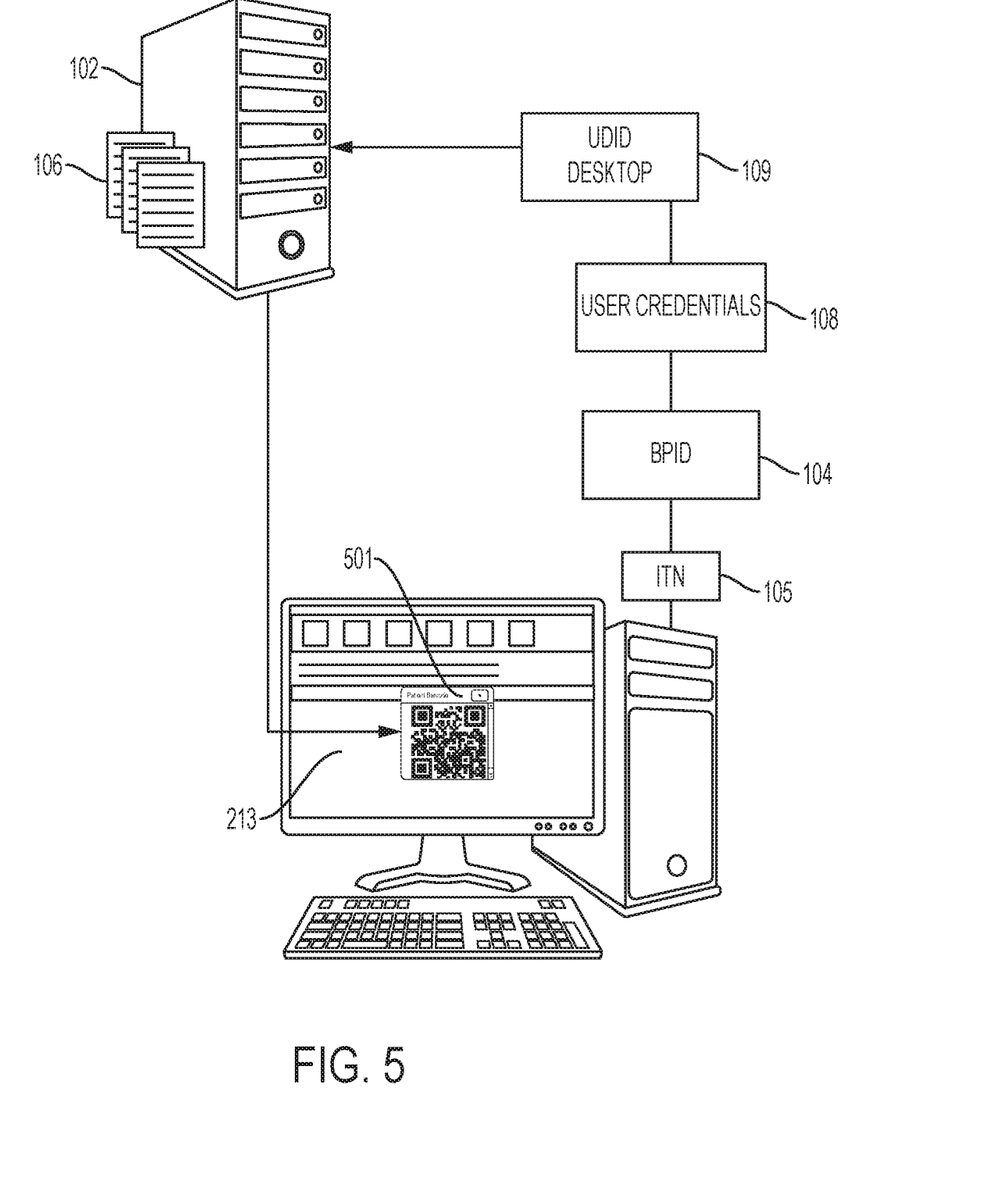
FIG. 5 is a system diagram showing the process of preparing the form for hand-off to a mobile device.
Figure 6:
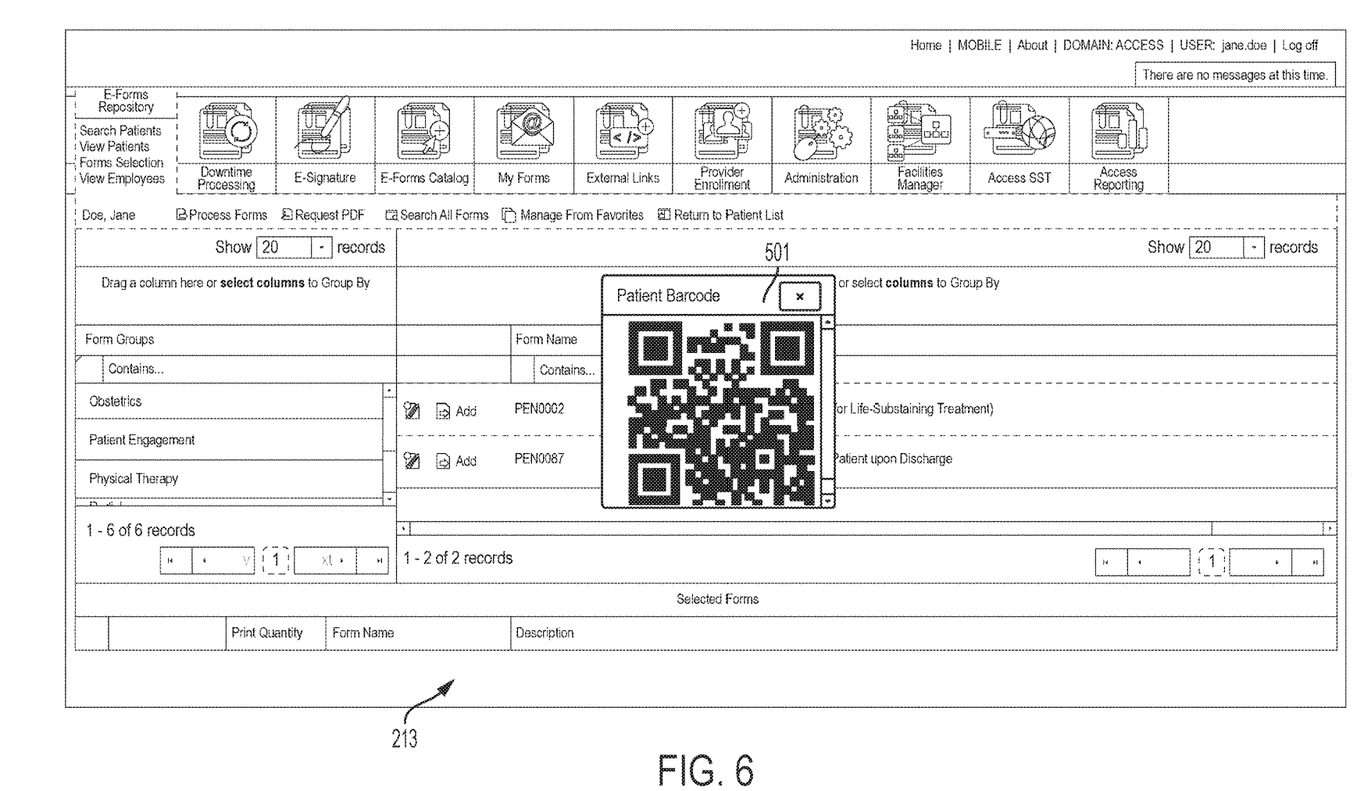
FIG. 6 is a screen shot showing one embodiment of presentation of the barcode to the mobile device.

Each time the hand-off process is initiated, a two-dimensional barcode 501 with content identifying the one or more documents offered for hand-off is generated by the server 102 and displayed on the monitor on a the Handoff Screen 213 as shown in FIG. 5 and FIG. 6. In some embodiments, this barcode 501 includes a single use token for security purposes. Each time the barcode 501 is displayed on the monitor, the UDID 109 and UC 108 of the user and device initiating the hand-off process, BPID and ITN 104 and 105 are date/time stamped and stored on the server 102 as an audit and tracking entry.

Figure 7:
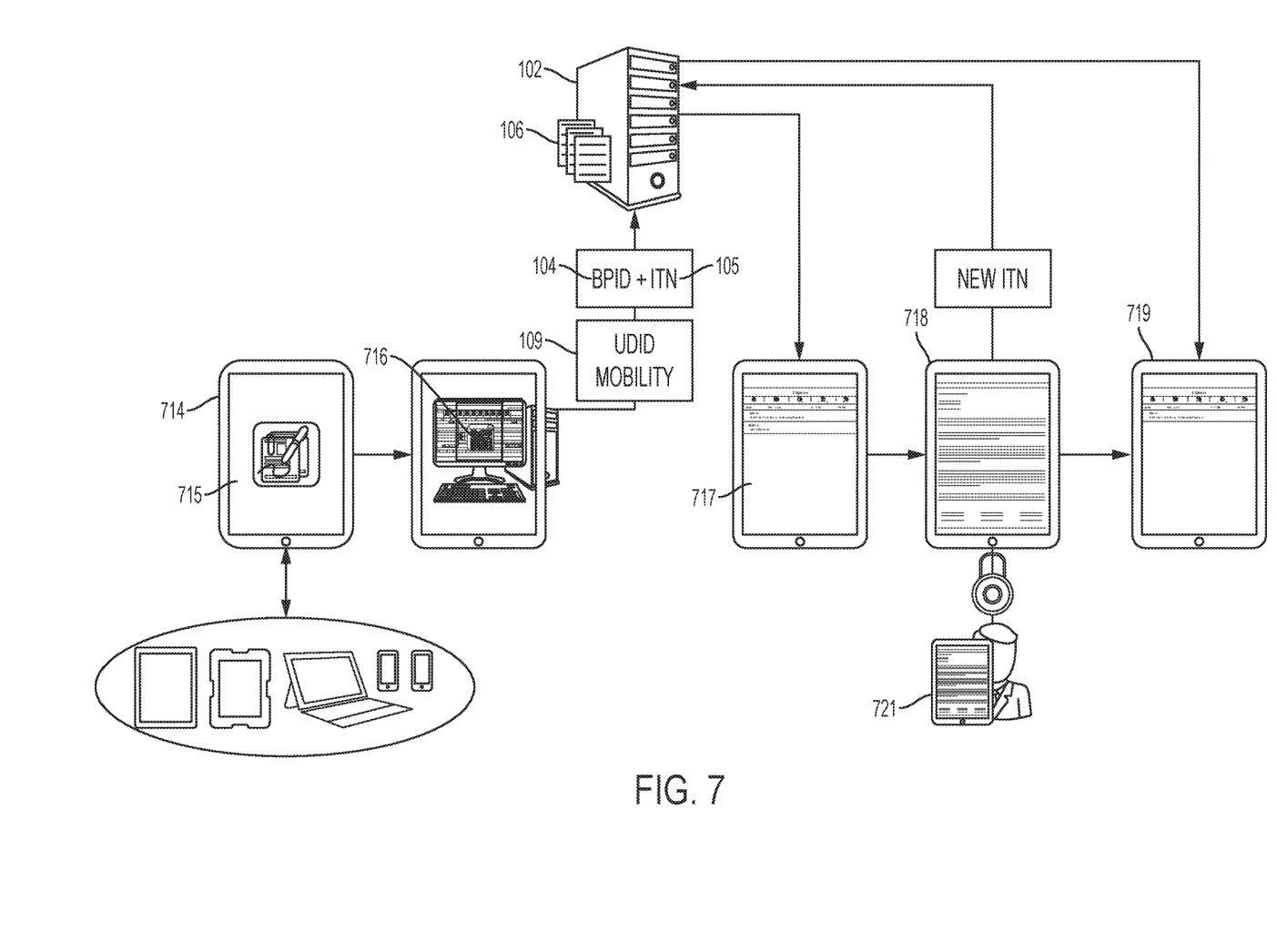
FIG. 7 illustrates the process of launching the electronic signature application on a mobile device, scanning the displayed barcode, and transferring control of the selected form from the desktop to the mobile device.
Figure 8:
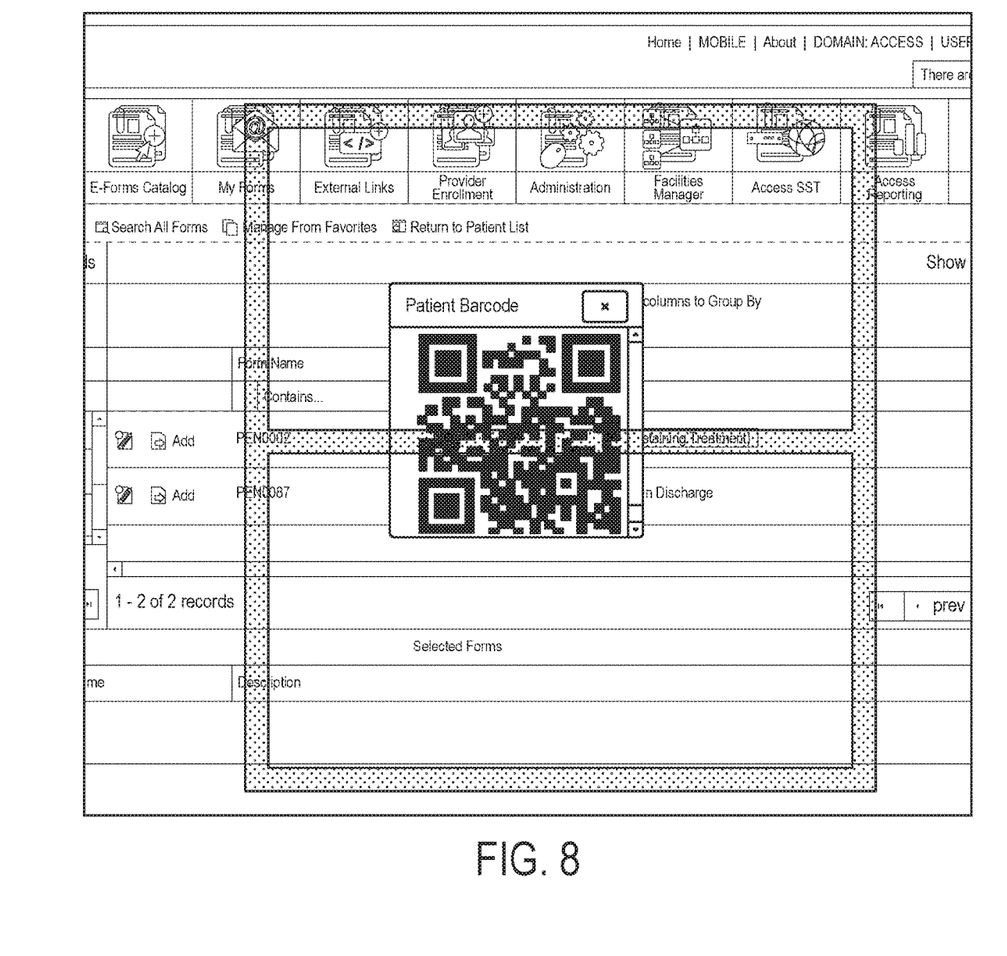
FIG. 8 is a screen shot showing one embodiment of the scanning of the barcode.

Referring now to FIG. 7 which shows a series of screens of a mobile device 714 progressing through the handoff process. The first screen 715 shows the handoff application being loaded onto the mobile device 714. The second screen 716, which is also shown in FIG. 8, shows how the camera of the mobile device 714 is used to scan the barcode 501 displayed on the monitor using a camera integrated into the mobile device 714.

When the barcode 501 is scanned, the UDID 109 of the scanning device, BPID 104 and ITN 105 are date/time stamped and stored on the server 102 as audit and tracking entries.

Figure 9:
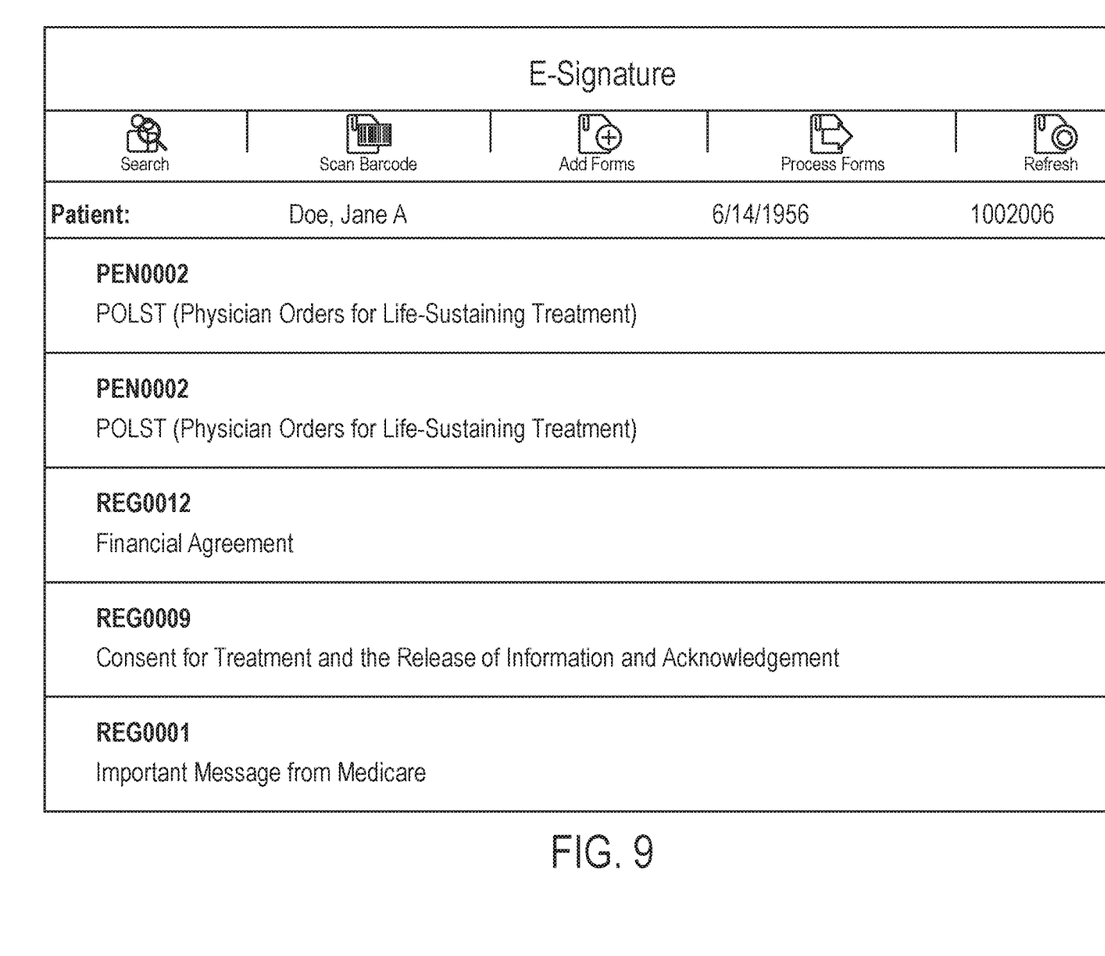
FIG. 9 is a screen shot showing one embodiment of the presentation of a list of available forms to the mobile device.
Figure 10:
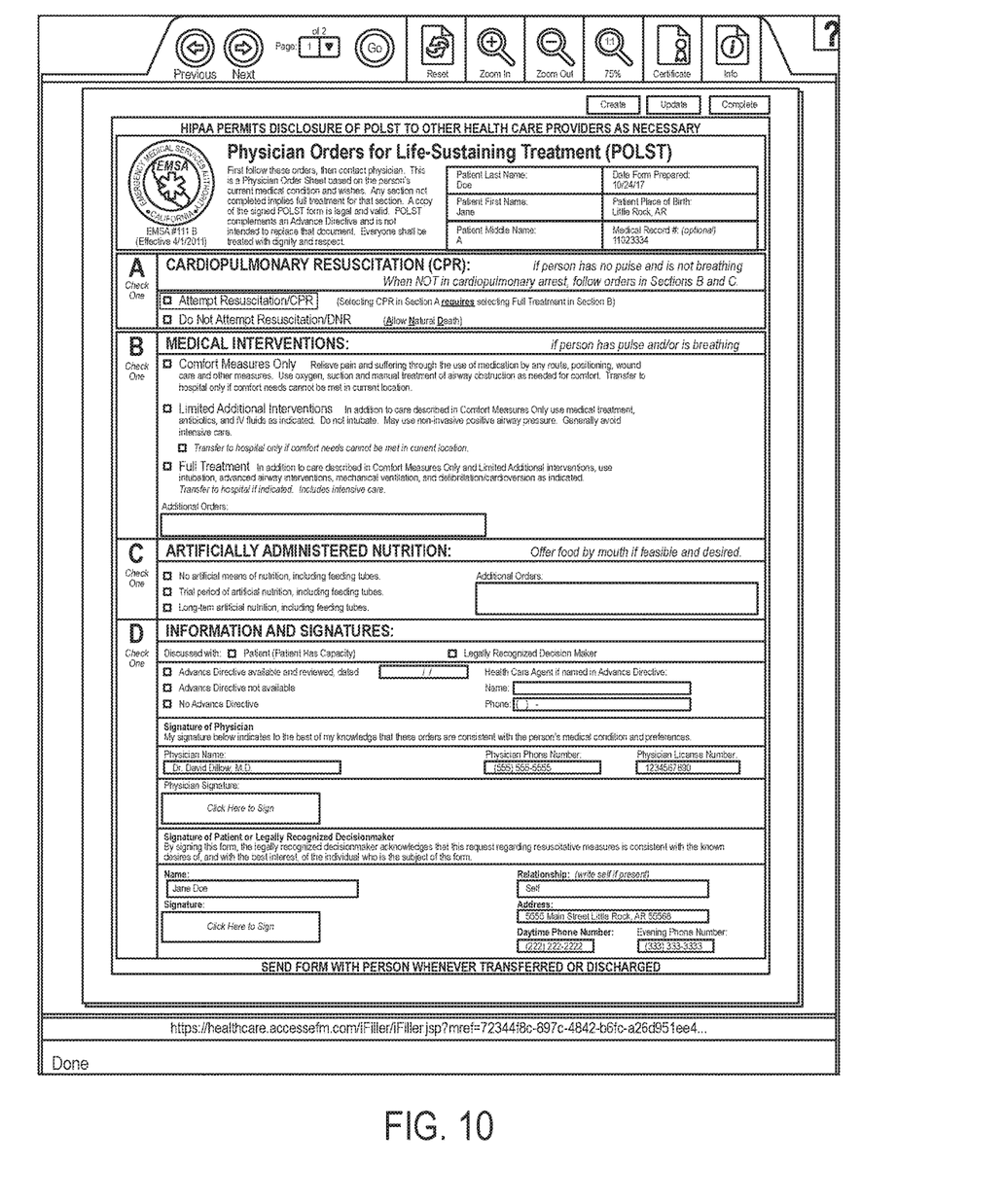
FIG. 10 is a screen shot showing one embodiment of a form selected for editing on the mobile device.
Figure 11:
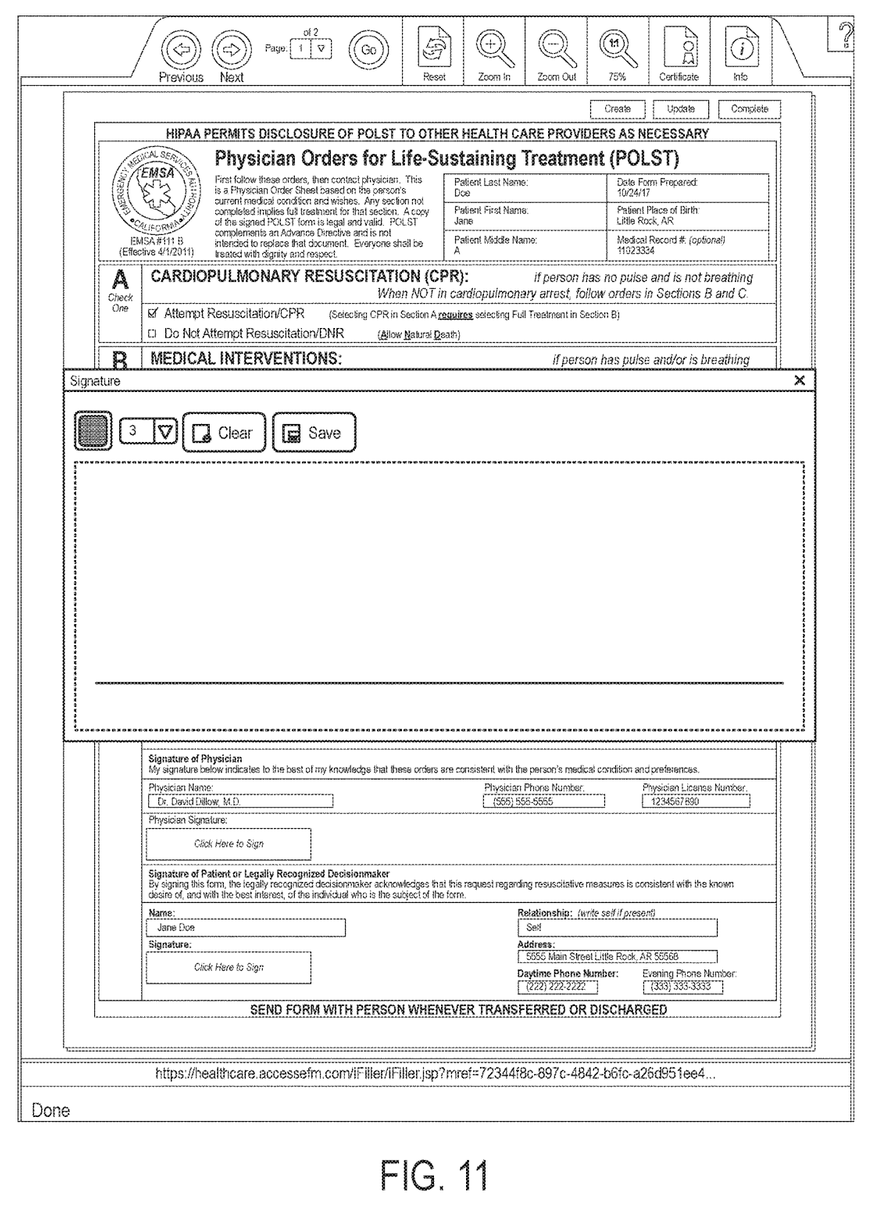
FIG. 11 is a screen shot showing one embodiment of the presentation of a signature block on the mobile device.

Using the information contained within the barcode 501, the application running on the mobile device 714 retrieves one or more documents for editing from the server 102. The application presents a screen 717 to the user in which the user has the opportunity to select a form to be completed as shown in FIG. 9. The application then displays a screen 718 with the selected form or forms in a format ready for editing as shown in FIG. 10. The application presents a screen as shown in FIG. 11 in which the user is presented with the opportunity to sign the form. The application then displays a screen 719 in which the user has the option to complete the finished form as shown in FIG. 12.

Each successful hand-off is maintained in the tracking and audit trail of the life-cycle of the document. The forms are displayed in a proprietary application in-app browser on the mobile device 714 for completion, but no forms or data reside on the mobile device 714, they all remain on the server 102 and the mobile device 714 functions as a "window" to these forms. No electronic footprints or data are left on the mobile device 714.

If another user attempts to access a form after that form has been handed-off or is currently open for review and edit 721, a message is displayed stating that the form is in use and offering the option of a READ-ONLY view.

Once each form is completed 719 and submitted from the mobile device 714, a new ITN 105 is assigned to the form and the audit trail and all tracking information is updated.

As the forms are completed and submitted from the mobile device 714, they are removed from the queue. Any forms that are not completed can be retrieved later for interaction either on a desktop PC or a mobile device.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiments is described herein, it will be readily apparent that more than one embodiment may be used in place of a single embodiment. Similarly, where more than one embodiment is described herein, it will be readily apparent that a single embodiment may be substituted for that one device.

In light of the wide variety of methods for electronic document hand-off known in the art, the detailed embodiments are intended to be illustrative only and should not be taken as limiting the scope of the invention. Rather what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only be the allowed claims and their equivalents. Unless explicitly recited, other aspects of the present invention as described in this specification do not limit the scope of the claims.

I claim:

1. A method for transferring editing control of a form document, comprising:
   creating a new instance of a form document, wherein the form document resides on a server in communication with a personal computer and a mobile device;
   associating the form document with a unique business process identifier and an instance tracking number, both of which reside in a catalog on the server;
   associating a customer with the form document by use of a unique customer identification code;
   collecting and storing user credentials of a user who associated the customer with the form document and a unique device identifier of the user's personal computer;
   displaying a barcode on a monitor in communication with the personal computer, wherein a link to the form document is accessible through the barcode;
   scanning the barcode with a camera integrated in the mobile device;
   accessing the link to the form document through the mobile device; and
   editing the form document on the mobile device.

2. The method of claim 1, wherein each time the barcode is displayed on the monitor, user credentials of the user who associated the customer with the form document, a unique device identifier of the user's device, a unique business process identifier, and an instance tracking number are date and time stamped and stored on the server as an audit and tracking entry.

3. The method of claim 1, wherein a unique device identifier of the scanning device, a unique business process identifier, and an instance tracking number are date and time stamped when the barcode is scanned and stored on the server as audit and tracking entries.

4. The method of claim 1, wherein a new instance tracking number is assigned to the form document after the form document is edited on the mobile device and stored on the server as audit and tracking entry.

5. The method of claim 1, wherein a second user's access to a form document is denied while a first user is accessing that form document.

6. The method of claim 1, wherein the barcode includes a single use token for security purposes.

7. A mobile device for editing form documents, comprising:
   a mobile device in communication with a server,
   the server being also in communication with a personal computer;
   wherein a form document is created on the personal computer and stored on the server at which time the form document is associated with a unique business process identifier and an instance tracking number, both of which reside in a catalog on the server, a customer is designated and associated with a unique customer identification code and a user credentials of a user who associated the customer with the form document and a unique device identifier of the user's device are stored on the sever; a barcode is displayed on a monitor in communication with the personal computer, wherein a link to the form document is accessible through the barcode; and a camera integrated into the mobile device is used to scan the barcode, thereby allowing the mobile device to access the form document through the link.

8. The mobile device of claim 7, wherein each time the barcode is displayed on the monitor, the user credentials of the user who associated the customer with the form document, a unique device identifier of the user's device, a unique business process identifier, and an instance tracking number are date and time stamped and stored on the server as an audit and tracking entry.

9. The mobile device of claim 7, wherein a unique device identifier of the mobile device device, a unique business process identifier, and an instance tracking number are date and time stamped when the barcode is scanned and stored on the server as audit and tracking entries.

10. The mobile device of claim 7, wherein a new instance tracking number is assigned to the form document after the form document is edited on the mobile device and stored on the server as audit and tracking entry.

11. The mobile device of claim 7, wherein a second user's access to a form document is denied while a first user is accessing that form document.

12. The mobile device of claim 7, wherein the barcode includes a single use token for security purposes.

* * * * *